(No Model.)
W. S. EATON & E. A. FARGO.
ENGRAVING CHUCK.
No. 508,606. Patented Nov. 14, 1893.
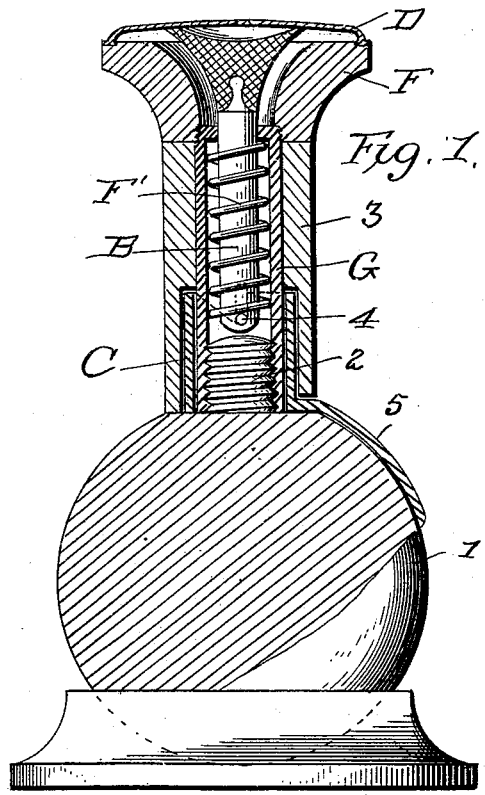
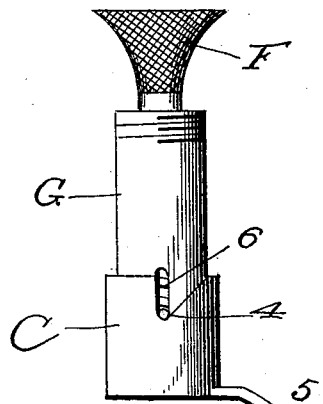
Attest
Wm. T. Hall
J. M. Copenhaver
Inventors
Wm. S. Eaton
Edwin A. Fargo
by Walter Dawlbauh
Attys

United States Patent Office.

WILLIAM S. EATON AND EDWIN A. FARGO, OF SAG HARBOR, NEW YORK, ASSIGNORS TO THE FAHYS WATCH CASE COMPANY, OF SAME PLACE.

ENGRAVING-CHUCK.

SPECIFICATION forming part of Letters Patent No. 508,606, dated November 14, 1893.

Application filed June 20, 1893. Serial No. 478,234. (No model.)

*To all whom it may concern:*

Be it known that we, WILLIAM S. EATON and EDWIN A. FARGO, citizens of the United States of America, residing at Sag Harbor, in the county of Suffolk and State of New York, have invented certain new and useful Improvements in Engraving-Chucks, of which the following is a specification, reference being had therein to the accompanying drawings.

This invention has reference to the means employed by engravers on watch-cases, lockets and similar articles wherein the work is or should be rigidly held while being operated upon.

Heretofore chucks for the purpose described have been made of wood or metal capable of expanding, by means of a taper pin centrally located and which is advanced or withdrawn to accomplish the necessary expansion for holding or releasing the back. Chucks have also been used for the purpose consisting of a block of wood of suitable shape and size to or upon which is applied a coating of a cement capable of being softened by heat. In using chucks of the latter kind, it is necessary for the workman to warm the article to be operated upon and at the same time heat the cement until it becomes plastic and sticky, and when in this condition, union is effected between the warmed back and the plastic cement by pressure and the chuck laid aside until the cement has had time to sufficiently cool and harden before the work can be operated upon. This method involves considerable loss of time to the workman and while in some respects it is superior to the expanding chuck, the difficulties in the matter of getting the work ready militates strongly against its use.

In using expanding chucks for such purposes as engraving watch-cases and the like, great care is necessary to avoid expanding the chuck so much as to put the watch or locket back out of shape and experience has shown that but few workmen, comparatively, possess sufficient judgment to use this class of chucks without injury to the work.

In our invention we overcome the hereinbefore named difficulties, and produce a chuck which is incapable of injuring the work in the slightest degree. We depend for our means of holding the work firmly, on atmospheric pressure, and so have provided means for producing a vacuum beneath the work to be operated upon. By means of our chuck the work may be instantly applied to, or detached from, the chuck without the slightest danger of injury.

In the accompanying drawings:—Figure 1, represents a sectional view through the chuck and its base or support, and Fig. 2, is an elevation of part of the same.

In the figures the chuck is represented as being mounted upon and secured to a spherical base which is of ordinary use being adapted to a corresponding socket to permit universal movement. This base 1 has a screw threaded projection 2 to which is attached a barrel or casing G. To the upper end of this barrel is secured the head F of the chuck which is adapted to receive the work. Its edge is preferably rabbeted to receive the inner flange or edge of the case. This head is removably secured to the barrel so that it may be readily removed to provide for the use of heads of other sizes. An outer casing 3 surrounds the barrel G as shown in Fig. 1, having a space between it and the casing. Within the barrel G is a spindle B under spring tension by means of a spring F' encircling it and tending to keep it normally pressed down. This spindle carries on its upper end a flexible diaphragm or sucker of rubber or other elastic material, located within the flaring mouth of the head F. The upward movement of the spindle to force the sucker against the watch case back D is effected by means of a cam C which is cylindrical and located within the space between the outer shell 3 and the barrel G, and this part C has a cam shaped depression in the upper edge which engages with a pin 4 projecting from the spindle B. The cam C has a handle 5 projecting through a slot in the outer casing and this extends down over the spherical base conforming thereto. The casing G is slotted at 6 to permit of the vertical movement of the spindle B, the pin 4, projecting through the slot and guided thereby. On turning the handle, the cam raises the pin and spindle and presses the diaphragm against the cover D thus forcing the air out of the interior cup shaped part. The handle is then pushed back and the spring exerts its force to depress the spindle which gives force to the vacuum action by distending the sucker F, the outer edge of which pulls upon the cover and holds it securely.

While our chuck is especially adapted for holding watch-case backs and like articles, it is also applicable to many other analogous purposes, and we do not limit ourselves to the specific uses herein named. We are not aware that a work holding chuck has ever been made on these ideas and we claim broadly the use of a vacuum and atmospheric pressure in a work holding chuck.

We claim—

1. A chuck consisting of a head for receiving the work and a vertically movable flexible sucker or diaphragm within the same adapted to be pressed against the work to force out the air and cause a vacuum holding action when released, substantially as described.

2. A chuck consisting of a head for the work, a flexible sucker within the same of cup shape and means for forcing the sucker against the work, substantially as described.

3. A chuck consisting of a head, a flexible sucker mounted on a vertically movable spindle under spring tension and means for moving said spindle substantially as described.

4. In combination, an outer casing, a barrel, a head secured thereto removably, a spindle under spring tension within the barrel, a flexible sucker carried thereby and a cam for operating the spindle, substantially as described.

In testimony whereof we affix our signatures in presence of two witnesses.

WILLIAM S. EATON.
EDWIN A. FARGO.

Witnesses:
W. C. GREENE,
E. R. GREENE.